Mar. 13, 1923.
R. G. HEMPHILL.
BASKET.
FILED DEC. 12, 1921.
1,448,626.
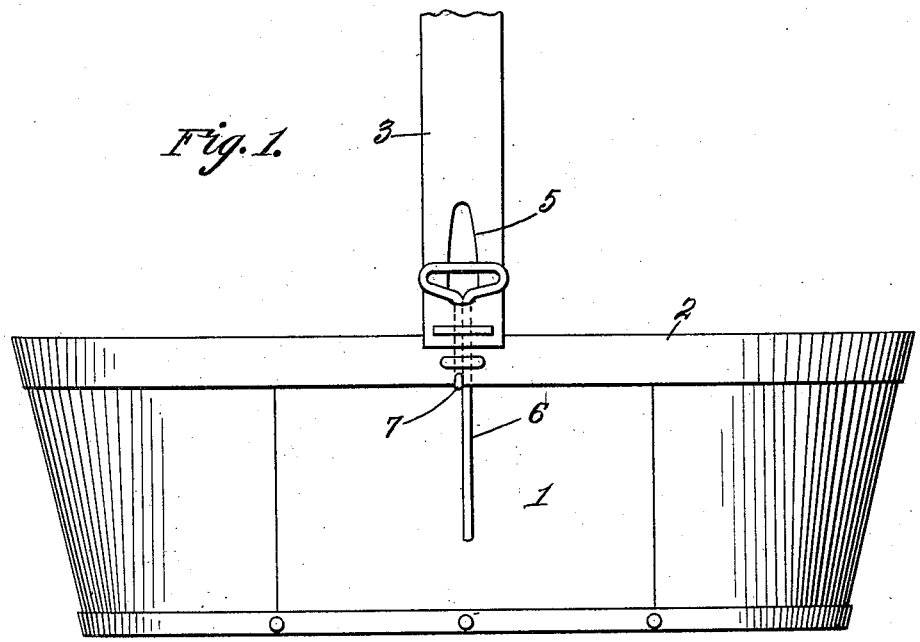
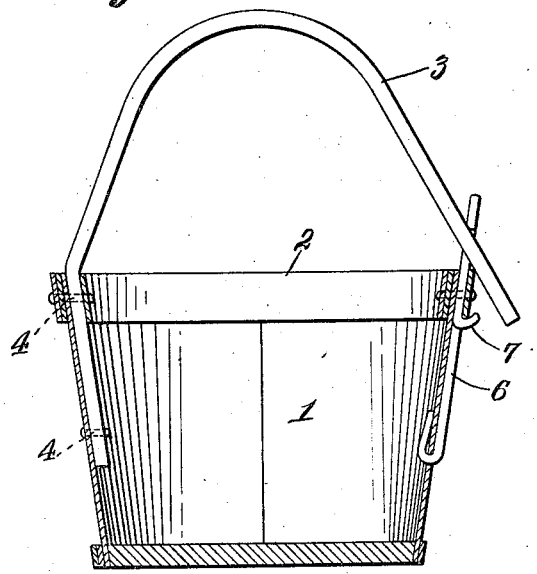
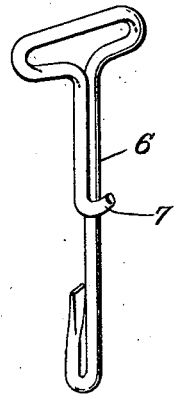
Robert G. Hemphill
INVENTOR
BY Victor J. Evans
ATTORNEY
WITNESS:

Patented Mar. 13, 1923.

1,448,626

UNITED STATES PATENT OFFICE.

ROBERT G. HEMPHILL, OF BARBERTON, OHIO.

BASKET.

Application filed December 12, 1921. Serial No. 521,724.

*To all whom it may concern:*

Be it known that I, ROBERT G. HEMPHILL, a citizen of the United States, residing at Barberton, in the county of Summit and State of Ohio, have invented new and useful Improvements in Baskets, of which the following is a specification.

This invention relates to improvements in baskets, the principal object of the invention being to provide a basket with a flexible handle.

Another object of the invention is to make one side of the handle detachable from the basket so that the baskets can be nested when desired and also to facilitate packing of the baskets.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the handle in connected position.

Figures 2 and 3 are detail views.

In these views 1 indicates the basket which is provided with the usual rail 2. The handle 3 is formed of flexible material such as leather and one end is permanently secured to one side of the basket, as shown at 4. The other end is provided with an eyelet 5 and a hook 6 is connected with the basket, at the side opposite to that to which the handle is permanently secured, for engaging the eyelet. This hook is provided with an enlarged head and the eyelet is so formed that the head will pass through the same when the part carrying the eyelet has been turned to one position but said head will be prevented from passing through the eyelet when the handle is in carrying position. This hook engages both the rail and a part of the side of the basket so that the strain is distributed to both the rail and side. The hook is provided with a bent part 7 for engaging the rail of the basket. The handle is of such a length that it will not drop into the bottom of the basket when in engagement with the hook.

It will thus be seen that the handle can be removed from the hook to permit a number of baskets to be nested together or to facilitate packing of the material in the basket or its removal therefrom. This removable handle will also enable the contents of the basket to be displayed without the handle obstructing the view.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A basket having a handle made of flexible material and means for detachably securing one end of the handle to the basket, such means consisting of a member having hooks thereon for engaging portions of the basket and a head which is located above the edge of the basket, said handle having an eyelet therein which is adapted to be placed over said head.

In testimony whereof I affix my signature.

ROBERT G. HEMPHILL.